(12) United States Patent
Chang et al.

(10) Patent No.: US 7,730,587 B2
(45) Date of Patent: Jun. 8, 2010

(54) HINGE APPARATUS

(75) Inventors: Jung-Wen Chang, Tao Yuan Shien (TW); Chih-Hsien Wu, Changhwa Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 881 days.

(21) Appl. No.: 11/495,614

(22) Filed: Jul. 31, 2006

(65) Prior Publication Data
US 2007/0204433 A1    Sep. 6, 2007

(30) Foreign Application Priority Data
Mar. 1, 2006    (TW) .............................. 95203386 U

(51) Int. Cl.
*E05C 17/64*    (2006.01)
(52) U.S. Cl. .......................................... 16/340; 16/366
(58) Field of Classification Search .................. 16/366, 16/368, 369, 340, 337, 334, 389; 361/679.6, 361/679.9, 679.17; 248/917–923, 284.1; 379/433.12, 433.13; 455/575.1, 575.3, 575.4, 455/550.1, 90.3; 348/333.06, 373, 794
See application file for complete search history.

(56) References Cited

U.S. PATENT DOCUMENTS

| 4,825,395 | A  | * | 4/1989  | Kinser et al. ........... 361/679.09 |
| 5,325,984 | A  | * | 7/1994  | Ady et al. .................... 220/817 |
| 5,708,560 | A  | * | 1/1998  | Kumar et al. .......... 361/679.17 |
| 5,987,704 | A  | * | 11/1999 | Tang ............................ 16/354 |
| 6,253,419 | B1 | * | 7/2001  | Lu ................................ 16/340 |
| 6,574,837 | B2 | * | 6/2003  | Jantschek ..................... 16/371 |
| 6,900,981 | B2 | * | 5/2005  | Kuivas et al. .......... 361/679.06 |
| 7,484,269 | B2 | * | 2/2009  | Chih et al. .................... 16/340 |
| 2003/0140456 | A1 | * | 7/2003 | Hsieh et al. ................... 16/340 |
| 2005/0050686 | A1 | * | 3/2005 | Kurokawa ..................... 16/354 |
| 2005/0081334 | A1 | * | 4/2005 | Tai ................................ 16/339 |

* cited by examiner

*Primary Examiner*—Chuck Y. Mah
(74) *Attorney, Agent, or Firm*—Rabin & Berdo, PC

(57) ABSTRACT

A hinge apparatus used to connect a base and a display unit comprises a connecting member、a first fastening member、a second fastening members、a first pivoting member and a second pivoting member, wherein the connecting member includes a first hole and a second hole. One end of the first pivoting member is fixed with a display unit and the other end crosses through the first hole and is then fastened with the first fastening member. One end of the second pivoting member is fixed with a base and the other end crosses through the second hole and is then fastened with the second fastening member. With the connectivity between the connecting member、the first pivoting member and the second pivoting member, the motion of the hinge apparatus is capable of rotating 360 degrees.

9 Claims, 5 Drawing Sheets

HINGE APPARATUS

RELATED APPLICATIONS

The present application is based on, and claims priority from, Taiwan Application Serial Number 95203386, filed Mar. 1, 2006, the disclosure of which is hereby incorporated by reference herein in its entirety.

BACKGROUND

1. Field of Invention

The present invention relates to a hinge apparatus. More particularly, the present invention relates to a hinge apparatus capable of rotating 360 degrees.

2. Description of Related Art

Two types of tablet PCs (Personal Computers) are available. One type has a keyboard and the other type doesn't and requires a stylus or voice command as the input device. The keyboard type tablet PC integrates a display unit and a base via a superimposing mechanism called a convertible tablet PC (for example—Acer TravelMate C300).

A convertible tablet PC requires several steps to convert it from one operational status (such as a normal notebook) to another operational status (such as tablet PC). First, the angle between the display unit and the base must be large enough; second, the display unit must be rotated 180 degrees; and finally, the display unit must be pushed down to cover the base. The main disadvantage of a traditional tablet PC is that these conversion steps are too complicated to use for those who are not familiar with a notebook or tablet PC.

Besides, during the second step, while rotating the display unit 180 degree, the screen can only be rotated in one direction, clockwise or counterclockwise depending on the hinge apparatus. In other words, the user has to remember the preset rotation direction when rotating the screen or the hinge apparatus may be damaged. To solve the problem, a user could apply a little force first to test which direction is correct, however, the little force accumulated over a long period would still cause damage to the hinge apparatus.

SUMMARY

It is therefore an aspect of the present invention to provide a hinge apparatus with an easy step to convert the convertible tablet PC. The hinge apparatus is capable of rotating 360 degree.

The hinge apparatus used to connect a base and a display unit comprises a connecting member、a first fastening member、a second fastening member、a first pivoting member and a second pivoting member wherein the connecting member includes a first hole and a second hole. One end of the first pivoting member is fixed with a display unit and the other end crosses through the first hole and is then fastened with the first fastening member. One end of the second pivoting member is fixed to the base and the other end crosses through the second hole and is then fastened with the second fastening member. With the connectivity between the connecting member、the first pivoting member and the second pivoting member, the hinge apparatus can rotate 360 degrees.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

Figure 1:
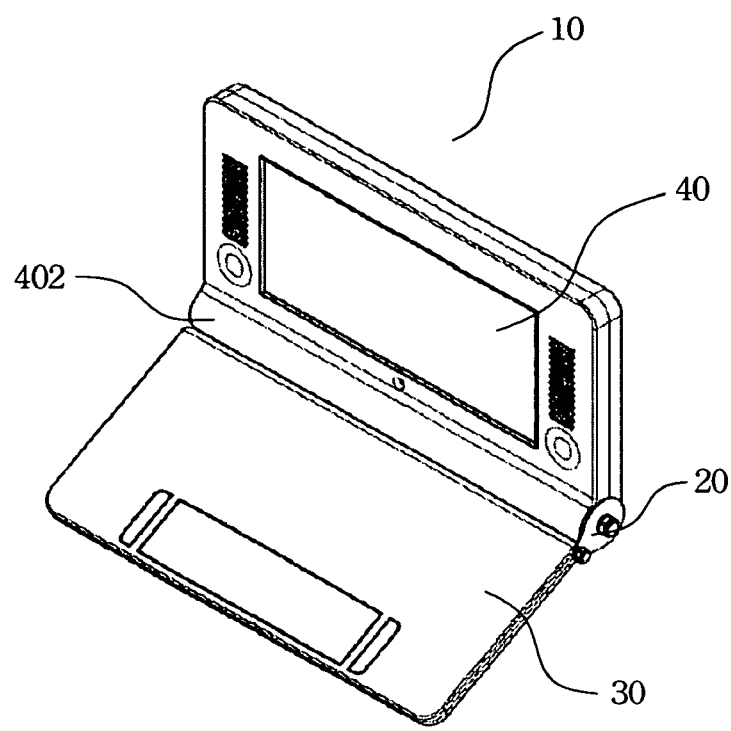
FIG. 1 is a schematic diagram of a computer device in accordance with a preferred embodiment of the present invention.

FIG. 1 is a schematic diagram of a computer device in accordance with a preferred embodiment of the present invention. In FIG. 1, a computer device 10 comprises a base 30、a display unit 40 and a connecting portion 402. The base 30 could be a host or a server; and the display unit 40 could be a touch panel to which a corresponding stylus is also required. The connecting portion 402 is a cylinder-shape and connects the base 30 and the display unit 40 to each other. Each end of the connecting portion 402 has a pivoting hinge apparatus 20 connecting the base 30 and the display unit 40.

Figure 2:
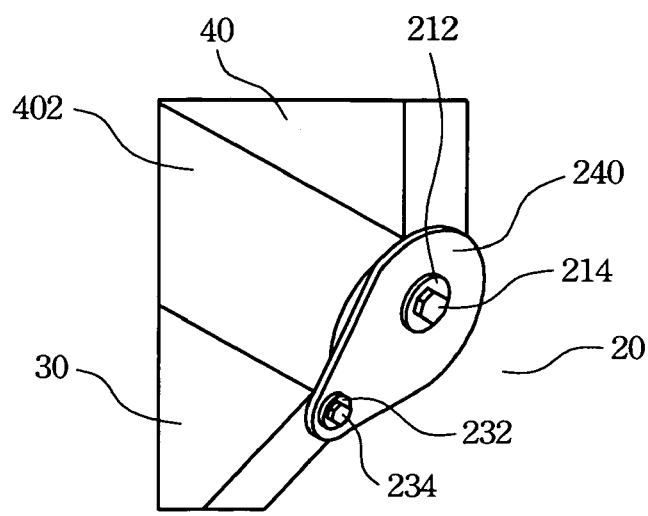
FIG. 2 is a schematic diagram of a hinge apparatus in accordance with a preferred embodiment of the present invention.

FIG. 2 is a schematic diagram of a hinge apparatus in accordance with a preferred embodiment of the present invention. In FIG. 2, the hinge apparatus 20 has two pivoting members (referring to FIG. 3, the first pivoting member 202 and the second pivoting member 222 are shown). Each pivoting member has two ends. One end is fixed with the base 30 or the display unit 40) and the other end crosses through a connecting member 240 and is fastened by a first fastening member 214 (or a second fastening member 234) respectively. Gaskets 212 (and 232) is placed between the connecting member 240 and the first fastening member 214 (and between connecting member 240 and the second fastening member 234) to buffer friction and compression from the first fastening member 214 (and the second fastening member 234).

Figure 3:
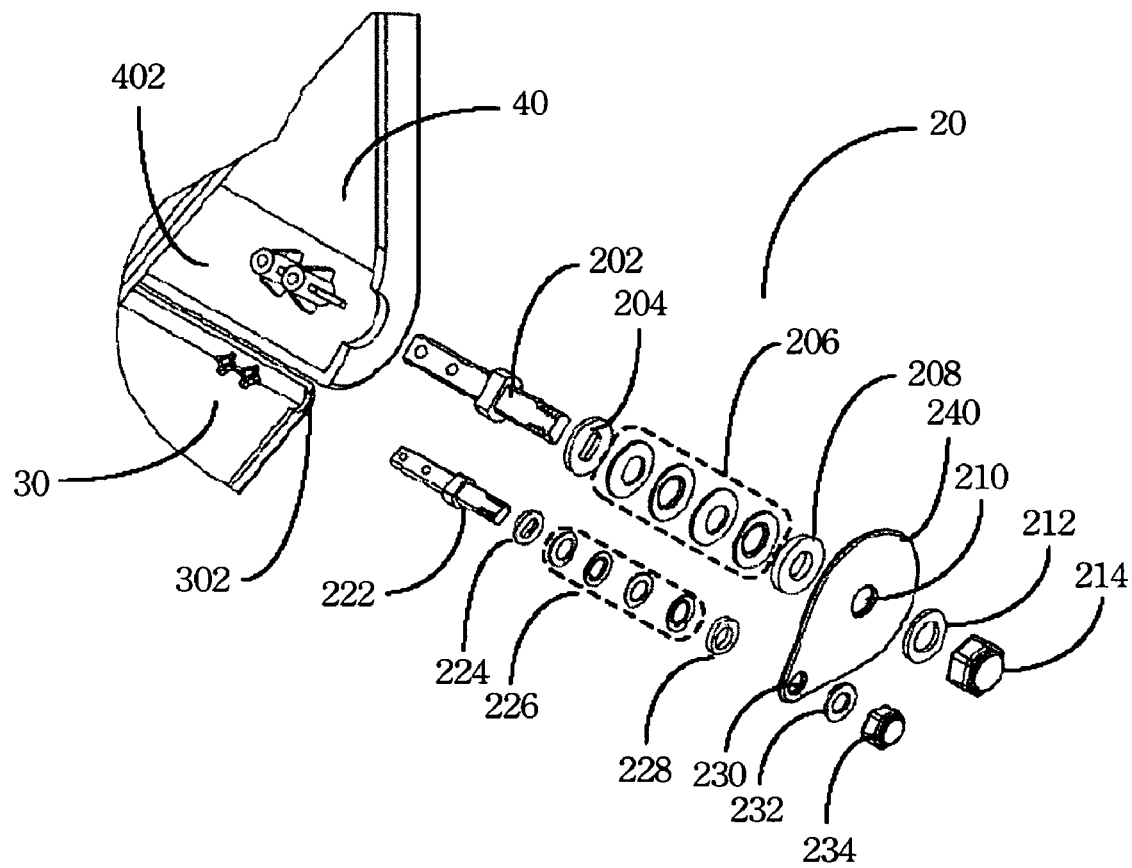
FIG. 3 is an exploded view of a hinge apparatus in accordance with a preferred embodiment of the present invention.

FIG. 3 is an exploded view of a hinge apparatus in accordance with a preferred embodiment of the present invention. In FIG. 3, the hinge apparatus 20 comprises a connecting member 240, a first fastening member 214, a second fastening member 234, a first pivoting member 202 and a second pivoting member 222. As illustrated in FIG. 3, the fan-shaped connecting member 240 is a substantially flat plate with a first hole 210 and a second hole 230. One end of the first pivoting member 202 is fixed with the display unit 40 and the other end crosses through a gasket 204, at least one elastomer 206, a gasket 208, the first hole 210 and a gasket 212 and is then fastened by the first fastening member 214. One end of the second pivoting member 222 is fixed with the base 30 and the other end crosses through a gasket 224, at least one elastomer 226, a gasket 228, the second hole 230 and a gasket 232 and is then fastened by the second fastening member 234.

The gaskets (204、208、212、224、228 and 232) are used as buffers to absorb the compression force from the first fastening member 214 and the second fastening member 234. The elastomers (206 and 226) such as springs are used to provide friction (elastic force) to sustain the display unit 40 at any angle and thus the user has to generate a force larger than the friction to rotate the display unit 40 to a specific location the user desires. The tighter the fastening members (214 and 234) are attached to the pivoting members (202 and 222) the larger the force required to rotate the display unit 40.

Figure 4A:
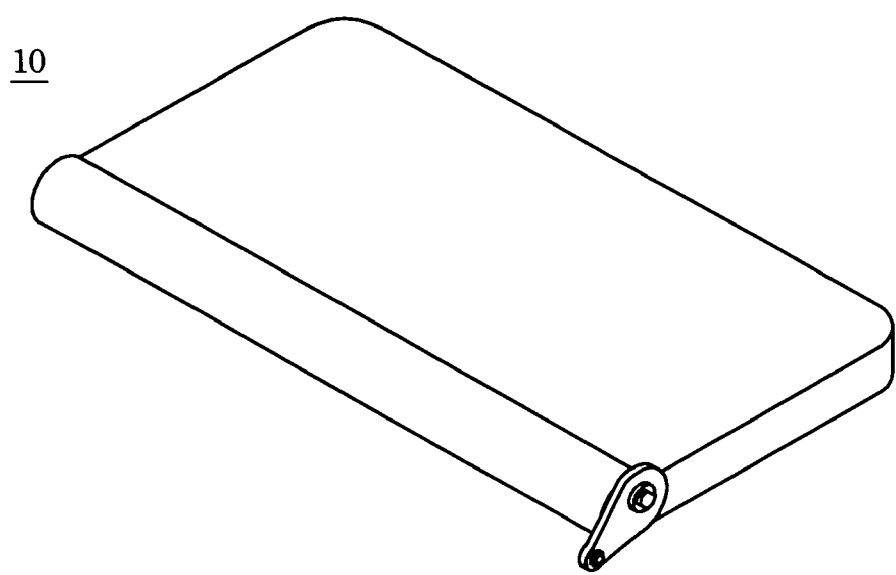
FIGS. 4a~4d is a series of continuous operation diagrams of a hinge apparatus in accordance with a preferred embodiment of the present invention.
Figure 4B:
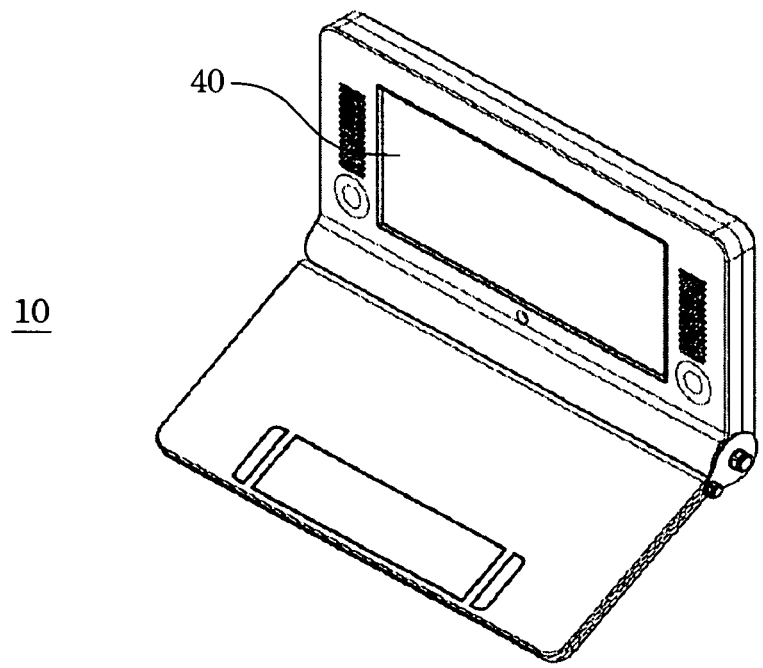
Figure 4C:
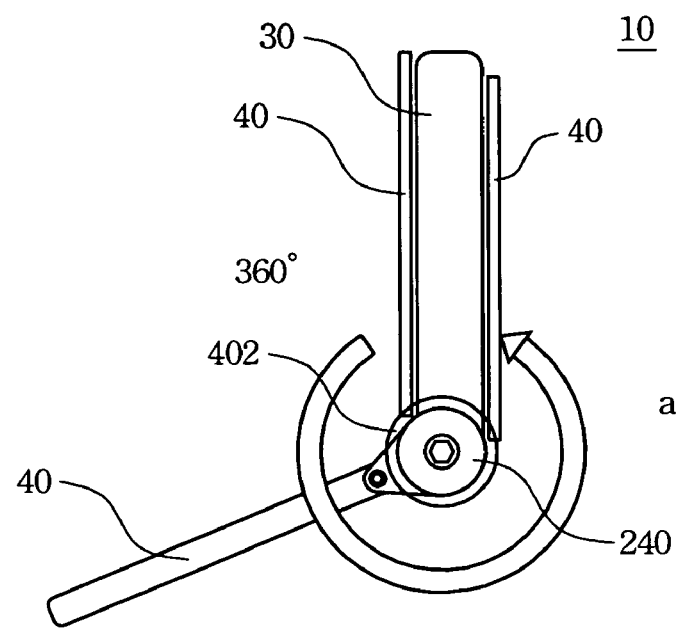

With the connecting member 240, the connectivity between the connecting member 240 the first pivoting member 202 and the second pivoting member 222, the motion of the hinge apparatus 20 is capable of rotating 360 degrees (as shown in FIG. 4c). With adequate friction (elastic force) from the elastomers (206 and 226), the display unit 40 could be held at any degree and not limited to some range of degrees.

Figure 4D:
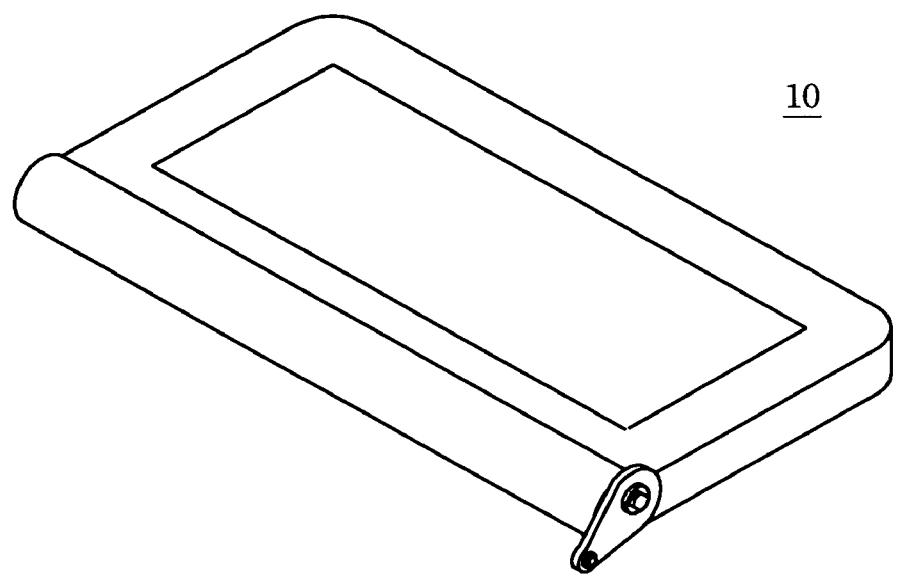

FIGS. 4a–4d is a series of continuous operational diagrams of a hinge apparatus in accordance with a preferred embodiment of the present invention. In FIG. 4a, the computer device 10 is in a closed state. After opening the display unit 20 40, the friction (elastic force) from the elastomers (206 and 226) supports the display unit 40 at the position to which it was pushed. The computer device 10 is at the present just like a normal notebook as shown in FIG. 4b. Referring to FIG. 4c, with the connecting member 240, user can keep pushing the display unit 40 in the original rotation direction to let the display unit 40 be completely superimposed on the back of the base 30. The computer then operates as a tablet PC as shown in FIG. 4d.

Figure 5:
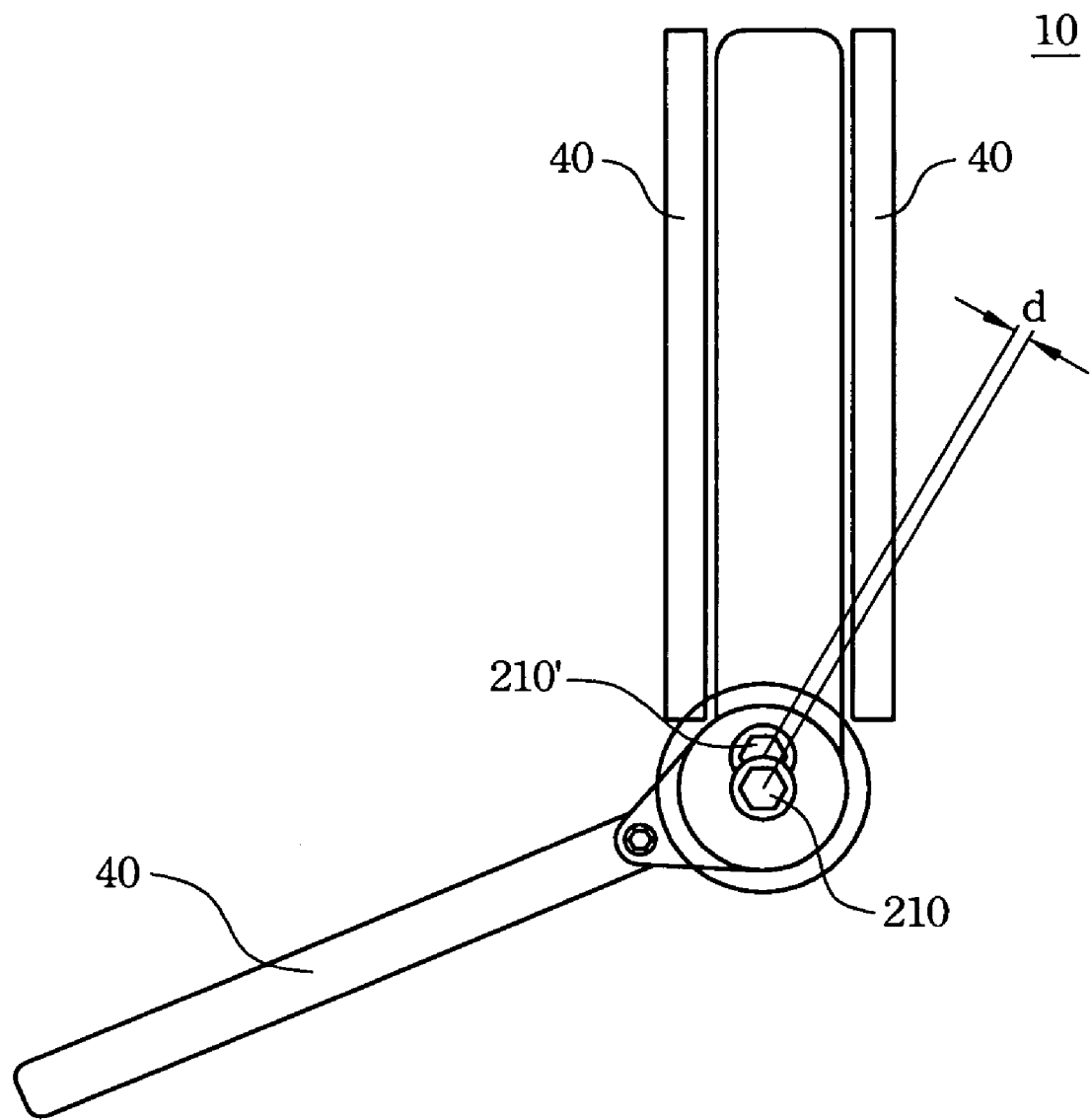
FIG. 5 is a folded side view of a hinge apparatus in accordance with a preferred embodiment of the present invention.

Due to the thickness of the base 30, the front end of the base 30 would not be aligned with the upper edge of the display unit 40 when the display 40 is superimposed on the base 30 (they look like stairs). To solve the alignment problem, the location of the first hole 210 would have to be shifted an adequate distance d from the original location as shown in FIG. 5 which is a folded side view of a hinge apparatus in accordance with a preferred embodiment of the present invention. In FIG. 5 the first hole 210 is at the original location while the first hole 201 is at a new location; with the shift, the front end of the base 30 would be aligned with the upper edge of the display unit 40 when the display unit 40 is completely superimposed on the base 30.

From the foregoing description, the invention has the following advantages: 1. The invention is easy simple and an intuitive convertible step for a convertible tablet PC. The user doesn't need to remember the preset rotation direction and doesn't need to test the preset rotation direction; 2. the base 30 and the display unit 40 would be aligned with each other which is aesthetically important for the user to hold and have a professional appearance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hinge apparatus used to connect a base and a display unit comprising:
    a first fastening member;
    a second fastening member;
    a connecting member consisting of a substantially flat plate with a first hole and a second hole;
    a first pivoting member with one end thereof adapted to be fixed to the display unit and the other end rotatably passing through the first hole and fastened with the first fastening member; and
    a second pivoting member with one end thereof adapted to be fixed to the base and the other end rotatably passing through the second hole and fastened with the second fastening member,
    wherein the connecting member is a fan-shaped member having a smaller end containing said first hole and a larger end containing said second hole, said smaller end adapted to be supported by said base and said larger end adapted to be supported by said display.

2. The hinge apparatus as claimed in claim 1, wherein the hinge apparatus further comprises:
    a first gasket;
    a first elastomer;
    a second gasket; and
    a third gasket;
    wherein the first pivoting member crosses the first gasket, the first elastomer, the second gasket, the first hole, and the third gasket, and is fastened with the first fastening member.

3. The hinge apparatus as claimed in claim 2, wherein the first elastomer is a spring.

4. The hinge apparatus as claimed in claim 1, wherein the first fastening member is a nut.

5. The hinge apparatus as claimed in claim 1, wherein the second fastening member is a nut.

6. The hinge apparatus as claimed in claim 1, wherein when the display unit is superimposed on the base, a front end of the base is aligned with an upper edge of the display unit.

7. A hinge apparatus used to connect a base and a display unit comprising:
    a first fastening member;
    a first pivoting member having an end adapted to be fixed to the display unit and an opposite end fastened with the first fastening member;
    a first pair of gaskets to be penetrated through by the first pivoting member;
    a second fastening member;
    a second pivoting member having an end adapted to be fixed to the base and an opposite end fastened with the second fastening member;
    a second pair of gaskets to be penetrated through by the second pivoting member; and
    a connecting member disposed between the first pair of gaskets and between the second pair of gaskets, wherein the connecting member consists of a substantially flat plate with a first hole and a second hole, the first hole being rotatably penetrated through by the first pivoting member, the second hole being rotatably penetrated through by the second pivoting member,
    wherein the connecting member is a fan-shaped member having a smaller end containing said first hole and a larger end containing said second hole, said smaller end adapted to be supported by said base and said larger end adapted to be supported by said display.

8. The hinge apparatus as claimed in claim 7, wherein the first fastening member is a nut.

9. The hinge apparatus as claimed in claim 7, wherein the second fastening member is a nut.

* * * * *